United States Patent

Dower

[15] 3,646,607
[45] Feb. 29, 1972

[54] APPARATUS FOR CONTROLLING FLUID FLOW THROUGH A CONDUIT

[72] Inventor: Ethell J. Dower, Houston, Tex.
[73] Assignee: Warren Automatic Tool Company, Houston, Tex.
[22] Filed: Oct. 24, 1969
[21] Appl. No.: 869,244

Related U.S. Application Data

[63] Continuation-in-part of Ser. No. 650,854, July 3, 1967, Pat. No. 3,479,001.

[52] U.S. Cl. .................................137/604, 175/218, 251/5
[51] Int. Cl. .................................F16k 31/12, F16l 55/14
[58] Field of Search ............137/583, 604; 138/45; 175/218; 239/428.5; 251/4, 5, 117

[56] References Cited

UNITED STATES PATENTS

| 2,248,731 | 7/1941 | Young | 137/604 X |
| 3,082,960 | 3/1963 | Swan | 239/428.5 X |
| 3,365,009 | 1/1968 | Burnham et al. | 251/5 X |
| 3,450,350 | 6/1969 | Gullaksen | 239/428.5 |

*Primary Examiner*—Robert G. Nilson
*Attorney*—Paul E. Harris and Lee R. Larkin

[57] ABSTRACT

An apparatus for controlling the flow of fluid such as drilling mud through a conduit. It includes a housing arranged for fluid flow therethrough and is provided with a resilient generally tubular shaped flow controlling means, such as a rubber sleeve, mounted in the housing. The rubber sleeve is arranged for radial inward deformation to control the flow of mud therethrough. The apparatus includes means for flowing another fluid into the conduit at a point adjacent the downstream end of the rubber sleeve to reduce turbulence and cavitation to thereby extend the usable life of the apparatus and particularly the rubber sleeve.

7 Claims, 3 Drawing Figures

PATENTED FEB 29 1972  3,646,607

Ethell J. Dower
INVENTOR

BY Lee R. Larkin
ATTORNEY

APPARATUS FOR CONTROLLING FLUID FLOW THROUGH A CONDUIT

CROSS-REFERENCE TO RELATED APPLICATIONS

This application is a continuation-in-part of application Ser. No. 650,854, filed July 3, 1967, and entitled CLOSURE MEMBER AND APPARATUS FOR CONTROLLED FLUID FLOW THROUGH A CONDUIT, by the same applicant, now U.S. Pat. No. 3,479,001.

BACKGROUND OF THE INVENTION

1. Field of the Invention

This invention relates to an apparatus for controlling the flow of a fluid, such as drilling mud or drilling fluid, through a conduit. More particularly, it relates to an apparatus for controlling fluid flow through a conduit and includes a deformable resilient generally tubular shaped flow controlling means such as a rubber sleeve whereby the fluid flow therethrough is controlled by deformation of the rubber sleeve. The apparatus of this invention has particular use or application in the well drilling art, as for example connection in the mud return line from a drilling well to impose back pressure on the bottom of the well and circulating out a "kick" or otherwise for controlling a well being drilled.

2. Description of the Prior Art

Many well control apparatuses have been developed for the general purpose of flowing return drilling mud therethrough in order to apply back pressure to a drilling well, and the embodiments shown in the aforesaid parent application are generally illustrative of the more recent art, as are the file references thereof. However, rubber sleeves of this general type suffer one serious disadvantage, particularly when it is necessary to control back pressures on the order of 1,500 p.s.i. or higher, for example. During such control operations, the rubber sleeve is normally deformed radially inward either by mechanical means or by another fluid pressure, thereby imposing back pressure on the return mud which is being pumped down the wellbore and returned therefrom by conventional mud pumps. At the relatively higher pressure, the rubber sleeve tends to bulge radially inwardly and toward the downstream end thereof. In addition, the rubber sleeve provides a Venturi effect to the mud being flowed therethrough, with the result that there is considerable cavitation and turbulence in the downstream bore of the rubber sleeve. This cavitation and turbulence results in considerable and sometimes excessive and destructive wear of the rubber sleeve, with portions of the rubber being broken away. Hence, the useful life of the rubber sleeve, in these instances is considerably reduced, particularly at the higher pressure levels discussed above.

SUMMARY OF THE INVENTION

It is therefore an object of this invention to provide an improved apparatus for controlling fluid flow through invention; conduit and which is arranged for overcoming the aforesaid problems.

Briefly stated, this invention is for an apparatus for controlling fluid flow of a first fluid, such as a drilling fluid, through a conduit. It includes, in the combination, a housing having an inlet and outlet connected to the conduit and arranged for flow of the first fluid therethrough. A resilient generally tubular-shaped flow controlling member, such as an elastomeric sleeve, is mounted in the housing and arranged for flow of the first fluid through the bore thereof. Means are provided for deforming at least a portion of the fluid flow controlling member radially inwardly to thereby control fluid flow therethrough. Further, means are provided for flowing a second fluid into the conduit at a point adjacent the downstream end of said flow controlling means to thereby reduce the turbulence of the first fluid during passage thereof through the flow controlling member.

The first fluid may be a drilling mud returned from a well bore and in a preferred embodiment, the second fluid is a gas. Further, the deforming means may be arranged for actuation by a pressurized third fluid.

In certain embodiments the means for flowing the second fluid into the conduit at a point adjacent the downstream end of the flow controlling member may include a plurality of passages through a portion of the housing and communicating with the conduit downstream of the closing portion of the closure member, and means for flowing the aspirating or third fluid through the passage into the conduit.

Certain embodiments of the invention may include an annular insert mounted in the housing and surrounding the downstream of the flow controlling member, with the insert having an annular recess thereby forming an annular chamber with the housing and having a plurality of generally axially extending passageways communicating with the passages in the housing, and means for flowing the second fluid to the annular chamber and through the passageways and passages into the conduit. Valve means may be interposed between the housing and the insert for preventing reverse fluid flow therethrough.

Additional embodiments of the invention may include a vessel connected to the conduit downstream from the housing and arranged to separate gas and liquid in the first fluid, and means for flowing gas from the vessel back to the housing as the second fluid.

BRIEF DESCRIPTION OF THE DRAWINGS

Reference to the drawing will further explain the invention wherein.

DESCRIPTION OF THE PREFERRED EMBODIMENT

Figure 1:
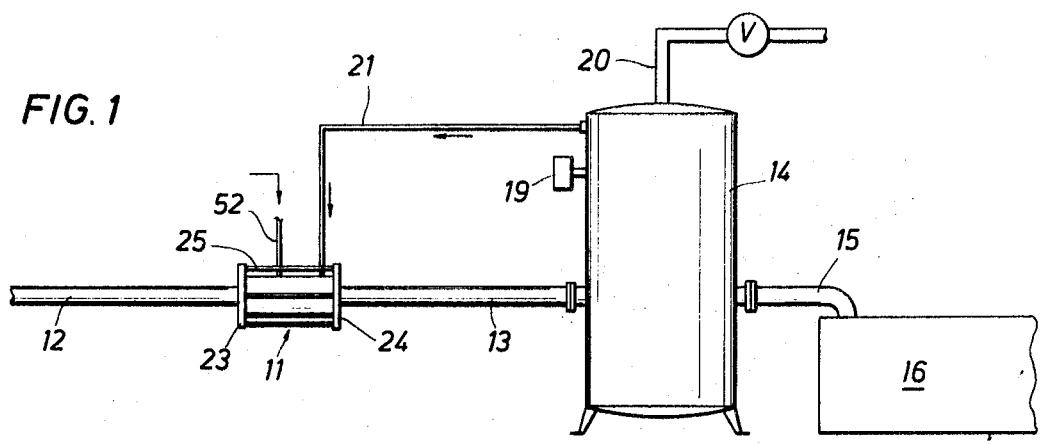
FIG. 1 is a generally schematic side elevation view of one presently preferred embodiment of the invention.

Referring now to FIG. 1, one preferred embodiment of the closure apparatus of this invention is generally designated by the numeral 11 and is shown connected to the drilling well return mud line 12 on the inlet end thereof and another mud line 13 on the outlet end thereof. In the embodiment shown, line 13 is connected for discharge into closed vessel 14 which vessel, for example, may be of the pressurized type shown in FIG. 1 of U.S. Pat. No. RE26220, for example. Vessel 14 is arranged for separating gas from liquid, as for example separating gas from drilling mud, with the drilling mud being discharged out discharge line 15 in response to conventional valve and float means (not shown) in vessel 14, thereby maintaining a specified level of mud in vessel 14. Mud discharge line 15 is arranged for dumping into a conventional mud pit 16, for example.

Vessel 14 may be pressure charged with another fluid, such as nitrogen supplied from a nitrogen bottle, schematically shown by the numeral 19. In addition, vessel 14 may be arranged for the discharge of gas therefrom through discharge line 20 controlled by appropriate pressure relief valve means.

In one form of the invention, an aspirating fluid gas line 21 is connected to communicate between the upper portion of vessel 14 and closure apparatus 11 to provide an aspirating fluid to closure apparatus 11.

Figure 2:
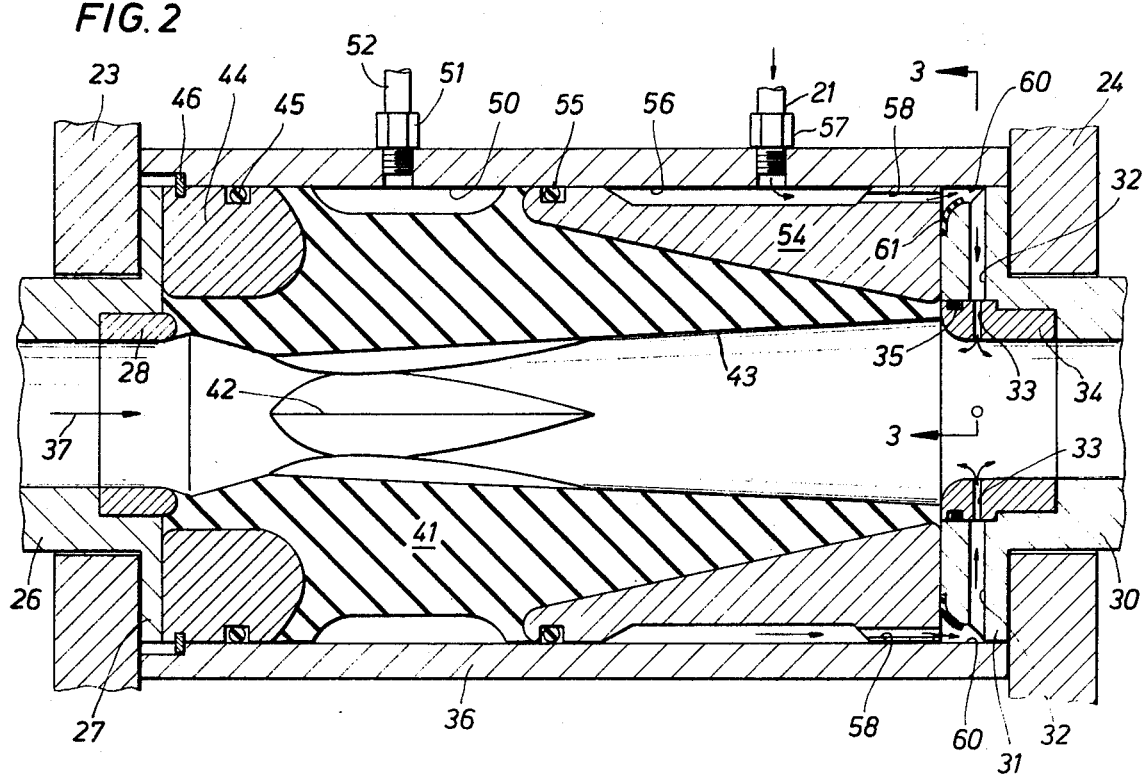
FIG. 2 is an enlarged cross-sectional view of the closure apparatus shown in FIG. 1, with certain portions broken away.
Figure 3:
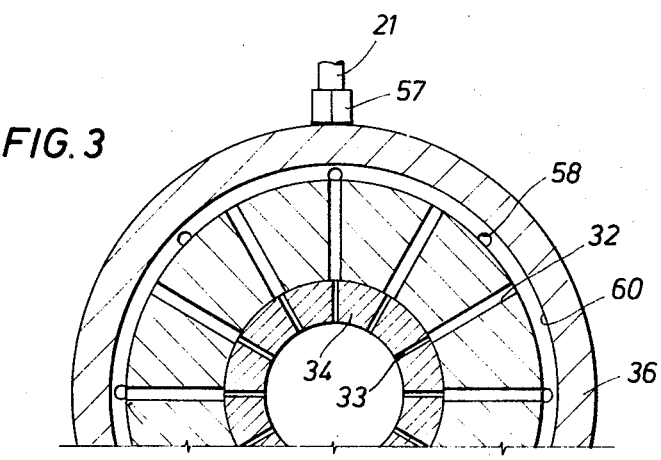
FIG. 3 is a cross-sectional view generally taken along line 3—3 of FIG. 2.

Referring now to FIG. 2, closure apparatus 11 includes an upstream annular ring-shaped flange 23 and a similar downstream flange 24 shown with the circumferential portions thereof broken away, but which flanges are held together by a plurality of axially extending bolts 25, as shown in FIG. 1.

The upstream end of apparatus 11 is connected to return mud line 12 by inlet connector 26 which passes through the annular opening in flange 23 and which has an annular flange portion 27 which is arranged to abut against flange 23. Connector 26 is also provided with an annular recess about the downstream end thereof in which is received a wear-resistant insert sleeve 28 which projects slightly downstream from the downstream end of flange portion 27.

The downstream end of closure apparatus is connected to line 13 by outlet connector 30 which extends through the annular opening through downstream flange 24 and is provided with an annular flange portion 31 which abuts against flange 24. Annular flange portion 31 is provided with a plurality of generally radially extending aspirator passages 32, the radially inwardly ends of which communicate with a similar plurality of radially extending passages 33 provided in annular wear-resistant insert sleeve 34 which is mounted in a recess in the upstream end of connector 30, as shown. Seal means in the form of O-ring seal 35 may be provided between insert sleeve 34 and annular flange portion 31 to prevent fluid flow therebetween.

Closure member 11 also includes an external tubular sleeve 36 which is supported between upstream flange 23 and downstream flange 24, with the ends thereof receiving annular flange portions 27 and 31 therein.

The apparatus includes a generally resilient tubular shaped flow controlling member mounted within tubular sleeve 36 and arranged for flow of drilling mud therethrough in the direction of arrow 37. This resilient fluid flow controlling member conveniently takes the form of a rubber sleeve type closure element 41 having an axial bore therethrough, which bore is comprised of an upstream portion 42 generally star shaped in cross section, and a generally circular and outwardly tapered downstream portion 43 arranged for the passage of drilling mud therethrough. The upstream end of closure element 41 may be bonded to an annular steel insert 44, the upstream end of which abuts against flange portion 27 and the peripheral edge of which abuts against the internal surface of tubular sleeve 36, and may be sealed against fluid flow therebetween by O-ring seal 45. Insert 44 is held against axial movement by clip ring 46 which is interposed between insert 44 and tubular sleeve 36, as shown. Insert sleeve 44 provides the function of giving closure element 14 greater resistance to deformation at the extreme upstream end thereof.

Closure element 41 is also provided with an annular recess thereabout which forms annular oil chamber 50 with tubular sleeve 36. Means are provided for deforming closure member 41 radially inward to thereby restrict fluid flow through portion 42 of the bore therethrough, which closure may be to the extent of stopping all fluid flow therethrough. These closure means may be mechanical, but are conveniently shown in the form of connector 51 passing through the wall of tubular sleeve 36 and communicating with oil chamber 50. Connector 51 is connected with pressurized fluid line 52 which may be connected to any convenient source of pressurized fluid, such as pressurized hydraulic fluid or the like which may be delivered therethrough at the desired pressure level to effect radial inward deformation of closure element 14, to hold the desired back pressure on the drilling mud flowing therethrough.

The downstream end of closure element 41 may also be bonded to a generally annular shaped steel insert 54 of somewhat greater axial length than insert 44 and having a generally inwardly tapered bore therethrough extending in the downstream direction. Preferably, element 41 is bonded to insert 54 to provide closure member 41 greater resistance to radial deformation in the downstream area.

When controlling the flow of drilling mud through closure element 41, closure element 41 is deformed radially inwardly as discussed above, to control the back pressure applied to drilling mud upstream thereof. The arrangement of closure element 41 is such that it is more readily deformed in the area of portion 42 of the bore, but with downstream portion 43 of the bore resisting deformation, as drilling mud passes therethrough. Passage of drilling mud through portion 42 creates a Venturi effect because of the reduced pressure and increased velocity downstream thereof. This increased velocity would cause cavitation and turbulence which would induce greater wear on the downstream portion of element 41 and particularly portion 43, in the absence of the arrangement of this invention.

Annular steel insert 54 may be provided with an annular recess thereabout forming an annular aspirator chamber 56 which communicates with aspirator fluid gas line 21 through connector 57 which is threaded into an opening into the sides of tubular sleeve 36, as shown.

Steel insert 54, is provided with an annular recess around the left end as viewed in FIG. 2, in which is inserted O-ring seal 55 to provide sealing engagement with tubular sleeve 36. In addition, annular steel insert 54 is provided with a plurality of generally axially extending passageways 58 through the periphery of the right-hand end as viewed in FIG. 2. Passageways 58 communicate at one end with aspiration chamber 56 and at the other end with annular chamber 60 formed between the peripheral edge of annular flange portion 31 and the internal surface of tubular sleeve 36. It is to be understood that aspirator passages 32 also communicate with chamber 60. Reverse fluid flow through passageways 58 is prevented by an annular resilient gasket 61 which acts as a valve means to move to the open position during flow of fluid in the direction of the arrows and closes off passageways 58 in the event of reverse flow.

For purposes of convenience, the internal bores of outlet connector 30 and insert sleeve 34 may sometimes be referred to as being part of the conduit through which the drilling mud is being flowed. Additionally, the bores through inlet connector 26 and insert sleeve 28 may also sometimes be referred to as a portion of the mud conduit through which the mud is flowed.

In operation of closure apparatus 11, fluid such as return drilling mud is flowed through return mud line 12 and through apparatus 11 in the direction indicated by arrow 37. The flow of drilling mud through element 41 and the back pressure applied to the mud is controlled by the extent of radially inward deformation of closure element 41, which deformation in the embodiment shown is controlled by the application of a fluid pressure, such as pressurized hydraulic fluid through line 52, connector 51 and into annular oil chamber 50. As pressure is applied in oil chamber 50, the star-shaped portion 42 of the bore through closure element 41 tends to close, thereby restricting fluid flow therethrough.

Aspirating fluid, such as a gas, is flowed through aspirator line 21, connector 57, aspirator chamber 56, passageways 58, annular chamber 60, aspirator passages 32 and 33, and into the mud stream adjacent the downstream end of closure member 11. The passage of gas in this manner relieves the cavitation and turbulence created by the Venturi effect on the flow of mud, as discussed above. By reducing this cavitational effect and turbulence, the amount of wear on closure element 41, and in particular the downstream bore portion 43, is considerably reduced. Air is one type of aspirating gas which may be used.

However, in some instances, a well being drilled will produce hydrocarbon gas, which if mixed with air might create an explosive mixture. Hence, it may be desirable in certain embodiments to use an inert gas or recycle the part of the produced gas which can be accomplished by connecting aspirator fluid gas 21 to a gas separator vessel, such as vessel 14 shown in FIG. 1 in the manner illustrated.

It is to be understood that closure element 41 may be of any resilient material, such as an elastomeric-type plastic, synthetic rubber, rubber or the like. The pressurized fluid admitted through line 52 to apparatus 11 may sometimes herein be referred to as the third fluid. While vessel 14 has been described as being a pressurized vessel, it is possible that a nonclosed vessel could be used, as for example, one which was arranged to separate the produced gas from the drilling mud passing therethrough.

Further modifications and embodiments will be apparent to those skilled in the art in view of this description.

What is claimed is:

1. In apparatus for controlling the flow of a first fluid through a conduit, the combination comprising:

a housing having an inlet and an outlet connected to said conduit and arranged for flow of said first fluid therethrough;

a resilient generally tubular shaped flow controlling member mounted in said housing and arranged for flow of said first fluid through the bore thereof;

means for deforming at least a portion of said flow controlling member radially inward to thereby control fluid flow therethrough;

means for flowing a second fluid into said conduit at a point adjacent the downstream end of said flow controlling member to thereby reduce turbulence of said first fluid during passage thereof through said flow controlling member;

a vessel connected to said conduit downstream from said housing and arranged to separate gas and liquid in said first fluid;

and, means for flowing gas from said vessel back to said housing as said second fluid.

2. In apparatus for controlling the flow of a first fluid through a conduit, the combination comprising:

a housing having an inlet and an outlet connected to said conduit and arranged for flow of said first fluid therethrough;

a resilient generally tubular-shaped flow controlling member mounted in said housing and arranged for flow of said first fluid through the bore thereof;

means for deforming at least a portion of said flow controlling member radially inward to thereby control fluid flow therethrough;

means for flowing a second fluid into said conduit at a point adjacent the downstream end of said flow controlling member to thereby reduce turbulence of said first fluid during passage thereof through said flow controlling member;

said means for flowing a second fluid into said conduit including a plurality of passages through a portion of said housing and communicating with said conduit downstream of the closing portion of said closure member;

an annular metal insert mounted in said housing and surrounding the downstream end of said flow controlling member, said insert having an annular recess thereabout forming an annular chamber with said housing, and having a plurality of generally axially extending passageways communicating with said passages in said housing;

and, means for flowing said second fluid into said annular chamber and through said passageways and passages into said conduit.

3. The invention as claimed in claim 2 including:

valve means interposed between said housing and said insert for preventing reverse fluid flow through said passageways.

4. In apparatus for controlling back pressure on a first fluid being flowed through a conduit, the combination comprising:

a housing having an inlet and an outlet connected to said conduit and arranged for flow of said first fluid therethrough;

a resilient generally tubular shaped elastomeric flow controlling member mounted in said housing and arranged for flow of said first fluid longitudinally therepast;

means for controllably and radially deforming at least a portion of said flow controlling member to thereby restrict flow of said first fluid therepast;

and, means for flowing a second fluid into said conduit at a point adjacent the downstream end of said flow controlling member to thereby reduce turbulence and cavitation of said first fluid after passage thereof past said flow controlling member, said means including a plurality of passages through a portion of said housing and communicating with said conduit adjacent the downstream end of said flow controlling member.

5. The invention as claimed in claim 4 wherein:

said second fluid is gas.

6. The invention as claimed in claim 4 wherein:

said first fluid is drilling fluid returned from a well bore.

7. The invention as claimed in claim 4 wherein:

said deforming means is arranged for actuation by a pressurized third fluid.

* * * * *